United States Patent [19]

Hayashi

[11] Patent Number: 4,740,735
[45] Date of Patent: Apr. 26, 1988

[54] APPARATUS AND A METHOD FOR CONTROLLING A WIPER

[75] Inventor: Kunihisa Hayashi, Toyota, Japan

[73] Assignee: Toyota Jidosha Kabushiki Kaisha, Aichi, Japan

[21] Appl. No.: 28,393

[22] Filed: Mar. 20, 1987

[30] Foreign Application Priority Data

Apr. 23, 1986 [JP] Japan .............................. 61-61540[U]

[51] Int. Cl.$^4$ ................................................ B60S 1/08
[52] U.S. Cl. ..................................... 318/483; 318/444; 318/DIG. 2; 15/250.17
[58] Field of Search .......... 318/443, 444, 483, DIG. 2; 15/250 C, 250.16, 250.17

[56] References Cited

U.S. PATENT DOCUMENTS

| | | | |
|---|---|---|---|
| 3,649,898 | 3/1972 | Inoue | 318/443 X |
| 3,826,979 | 7/1974 | Steinmann | 318/483 X |
| 4,037,146 | 7/1977 | Kondo | 318/444 |
| 4,107,588 | 8/1978 | Seiler | 318/484 |
| 4,355,271 | 10/1982 | Noack | 318/483 X |
| 4,389,603 | 6/1983 | Kogawa et al. | 318/444 X |
| 4,463,294 | 7/1984 | Gibson | 318/313 |

FOREIGN PATENT DOCUMENTS 56-120436 9/1981 Japan .

*Primary Examiner*—Bentsu Ro
*Attorney, Agent, or Firm*—Parkhurst & Oliff

[57] ABSTRACT

An apparatus for controlling a windshield wiper in accordance with the amount of rain falling on the windshield. The apparatus includes a rain sensor for detecting an amount of rain positioned thereon, a comparator for comparing the output of the rain sensor with one of first and second signals representing predetermined amounts of drops of water and producing a second output signal, a memory for memorizing the second output signal, an exchanger for exchanging one of the first and second signals for the other one, and an actuator for actuating the wiper at one of high and low wiping speeds. Further, the comparator produces an output according to whether the detected amount of rain is equal to or greater than one of the first and second predetermined amounts of drops of water.

20 Claims, 6 Drawing Sheets

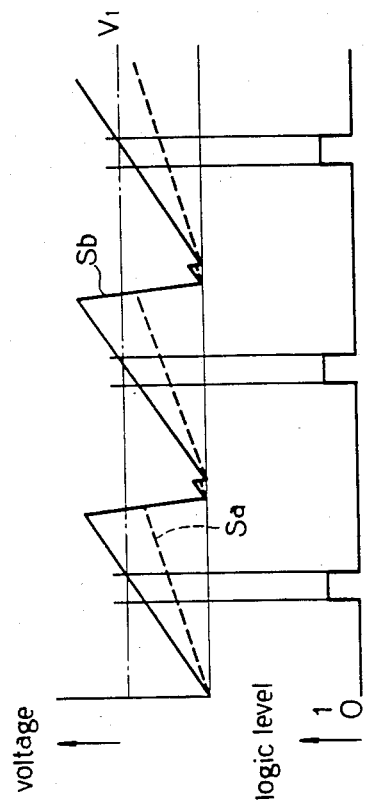
Fig. 7 (A)
Fig. 7 (B)
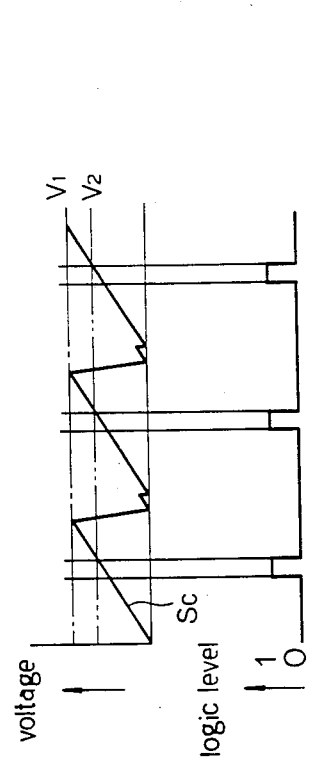
Fig. 7 (C)
Fig. 7 (D)

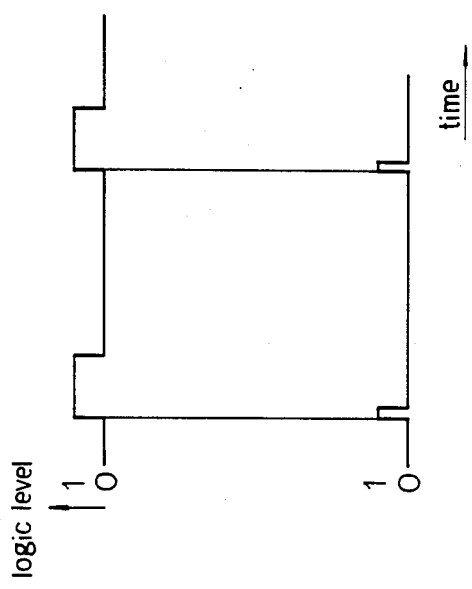

APPARATUS AND A METHOD FOR CONTROLLING A WIPER

BACKGROUND OF THE INVENTION

The present invention relates to an apparatus for controlling a wiper by controlling the wiping speed of the wiper in accordance with the amount of rain. More particularly, the present invention relates to improvements in means for controlling the wiper, which detects the amount of rain positioned on a detecting means regardless of the wiping speed of the wiper, so that even when the wiper moves at various wiping speeds the apparatus according to the present invention can control the wiping speed of the wipers in accordance with the amount of rain positioned on the detecting means.

A conventional wiper of an automobile moves at a low wiping speed or at a high wiping speed and the wiping speed is changed manually.

However, manual operation of the conventional wiper is troublesome. Further, when the amount of rain changes frequently, an operator must frequently change the wiping speed of the wiper.

SUMMARY OF THE INVENTION

The present invention was developed in view of the foregoing background and to overcome the foregoing drawbacks. It is accordingly an object of this invention to provide an apparatus for controlling a wiper, which exchanges a signal representing one of a plurality of predetermined amounts of drops of water for another signal representing another one of predetermined amounts of the drops of water, and which moves the wiper smoothly at different wiping speeds in accordance with the amount of rain.

To achieve a smooth change of a wiping speed of the wiper in accordance with the amount of rain, the apparatus for controlling a wiper includes first detecting means for detecting the amount of rain positioned thereon, a memory means, a comparator means for comparing a signal corresponding to the detected amount of rain with one of first and second preset signals representing predetermined amounts of drops of water, an exchanging means for exchanging one of the first and second preset signals with the other one of the preset signals and an actuator means.

The first detecting means outputs a first output signal corresponding to the detected amount of rain.

Further, the comparator means compares the first output signal with one of the first and second preset signals. When the first output signal is equal to or greater than the compared preset signal, the comparator means outputs a second output signal.

The memory means receives the second output signal outputted from the comparator means, memorizes the second output signal and outputs a fourth output signal, when said memory means memorizes the second output signal.

The exchanging means receives the second output signal outputted from the comparator means and exchanges the first preset signal for the second predetermined amount of drops of water preset signal.

The actuator means receives the fourth output signal outputted from the memory means and actuator the wiper at a high wiping speed in response the fourth output signal.

When the first output signal is greater than the first preset signal, the actuator means actuates the wiper at a high wiping speed, and also when the first output signal is greater than the second preset signals and said memory means memorizes the second output signal outputted from the comparator means.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements:

FIGS. 1(A)–1(C) are graphs showing relationships of signals of a first apparatus for controlling wipers in relation to an output signal outputted from the rain sensor, wherein FIG. 1(A) is a graph showing the relationship between an amount of rain positioned on a rain sensor and time, FIG. 1(B) is a graph showing the relationship between an output signal of first comparator means and time, and FIG. 1(C) is a graph showing the relationship between an output signal of second comparator means and time;

FIG. 7(A) through FIG. 7(D) are graphs showing relationships of signals of the control circuit according to the present invention in relation to an output signal outputted from the rain sensor, wherein FIG. 7(A) is a graph showing the relationship between a voltage signal outputted from an integration circuit at a low wiping speed condition and time, FIG. 7(B) is a graph showing the relationship between an initial position signal outputted from a second detecting means at the low wiping speed condition and time, FIG. 7(C) is a graph showing the relationship between a voltage signal outputted from the integration circuit at a high wiping speed condition and time, and FIG. 7(D) is a graph showing a relationship between the initial position signal outputted from the second detecting means at the high wiping speed condition and time;

FIG. 8(A) is a graph showing the relationship between the initial position signal and time; and FIG. 8(B) is a graph showing the relationship between an output signal outputted from a NAND circuit and time.

DETAILED DESCRIPTION OF THE PREFERRED EMBODIMENT

The present invention will be described in detail with reference to the accompanying drawings which illustrate a preferred embodiment according to the present invention.

A first apparatus for controlling a wiper includes detecting means for detecting the amount of rain positioned thereon and controlling means for controlling the wiping speed of the wiper. The detecting means is located on an exterior surface of a windshield of an automobile and the controlling means controls the wiping speed of the wiper in accordance with a signal outputted from the detecting means.

Figure 1:
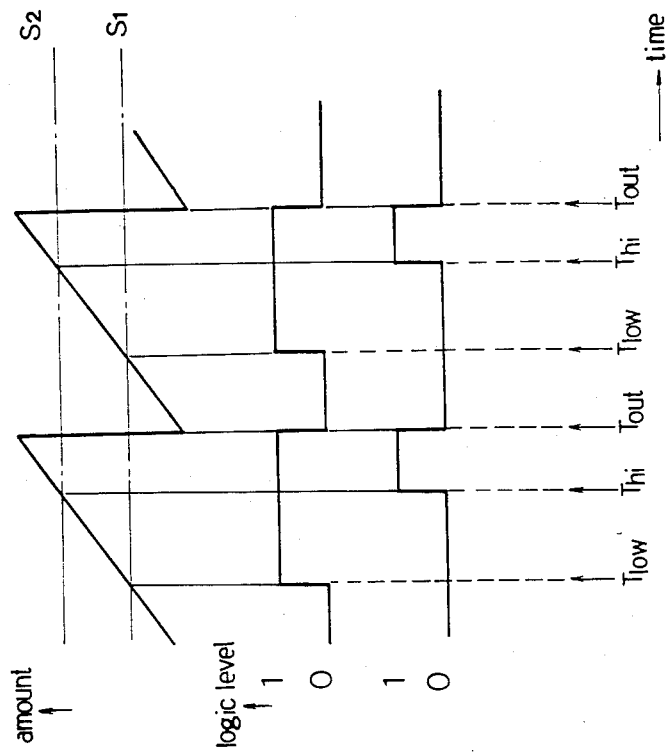

As shown in FIG. 1(A), the detecting means outputs a continuous signal in accordance with the amount of rain positioned on the detecting means and the controlling means includes first and second comparator means.

The first and second comparator means compare the output signal of the detecting means with first and second preset signals $S_1$ and $S_2$ representing large and small predetermined amounts of drop of water, respectively.

As shown in FIG. 1(B), when the first comparator means determines that the output signal of the detecting means is equal to or greater than the preset signal $S_1$, the controlling means outputs a logic level "1" low actuating signal to an actuator means of the wiper, and the wiper is moved at a low wiping speed.

On the other hand, when the output signal of the detecting means is less than the preset signal of $S_1$ the controlling means outputs a logic level "0" low actuating signal and the wiper is not actuated.

Accordingly, when the detecting means output signal is equal to or greater than the preset signal $S_1$ and less than the preset signal $S_2$, the wiper is driven at a low wiping speed.

Then when the the detecting means output signal is equal to or greater than the preset signal $S_2$, the second comparator means outputs a logic level "1" high actuating signal to the actuator means of the wiper, as shown in FIG. 1(C).

Accordingly when the detected amount of rain is equal to or greater than the large predetermined amount of drops of water, the wiper is driven at a high wiping speed.

Thus, the first apparatus can automatically change the wiping speed of the wiper in accordance with the detected amount of rain.

However, in the first apparatus, as shown in FIGS. 1(A) through 1(C), after the wiper wipes out drops of water positioned on the detecting means at a time $T_{out}$, the amount of the drops of water positioned on the detecting means gradually. Then, when the detecting means preset signal becomes equal to the preset signal $S_1$ at a time $T_{low}$, the wiper starts to move at the low wiping speed; and further, when the detecting means output signal becomes equal to the preset signal $S_2$ at a time $T_{hi}$, the wiper starts to suddenly move at the high wiping speed.

Finally, when the wiper wipes out the drops of water positioned on the detecting means the wiper stops its movement.

Therefore, when the detecting means output signal is equal to the preset signal $S_2$ during the movement of the wiper at the low wiping speed, the wiper starts to suddenly move at the high wiping speed from the low wiping speed. Accordingly, the movement of the wiper is not smooth.

To achieve smooth movements of the wiper, a second apparatus for controlling the wiper has been developed. The apparatus includes an actuator means, a comparator means and a memory means. The comparator means compares the detecting means output with the preset signals $S_1$ and $S_2$ during a wiping time period, defined between a time when the wiper wipes out the drops of water positioned on the detecting means and a time when the wiper returns to the initial position of the wiper. When the detecting means output signal is equal to or greater than the preset signal $S_2$, the comparator means outputs a logic level "1" high actuating signal.

On the other hand, when the detecting means output signal is less than the signal $S_2$, and equal to or greater than the signal $S_1$, the comparator means outputs a logic level "1" low actuating signal.

The memory means memorizes the high or low actuating signal outputted from the comparator means, and the memory means outputs the memorized high or low actuating signal to the actuator means at a time the wiper is positioned at its initial position. As a result, the wiping speed of the wiper is changed at the initial position of the wiper in accordance with the memorized high or low actuating signal. Therefore, the wiper of the second apparatus can wipe out a windshield smoothly.

However, in the second apparatus, the wiping time period, defined between a time when the wiper wipes out the water drops positioned on the detecting means and a time when the wiper returns to the initial position of the wiper, depends on the high or low wiping speed of the wiper.

Because when the wiper wipes out the water drops positioned on the detecting means and returns to the initial position at the high wiping speed and the amount of rain per second positioned on the detecting means is constant, the time period between the time when the wiper wipes out the water drops positioned on the detecting means and the time when the wiper returns to the initial position, is short and the amount of drops of water positioned on the detecting means is rather small.

As a result, the detecting means output signal may be less than the preset signal $S_2$ and the condition may result in the output of the low actuating signal. This occurs even if the actual amount of rain per second positioned on the detecting means is equal to or more than the large predetermined amount of drops of water.

On the other hand, when the wiper wipes out the water drops positioned on the detecting means and returns to the initial position at the low wiping speed and the amount of rain per second positioned on the detecting means is constant, the wiping time period between the time when the wiper wipes out the water drops positioned on the detecting means and the time when the wiper returns to the initial position is long, and the amount of drops of water positioned on the detecting means is rather large. As a result, the detecting means output signal may be more than the preset signal $S_2$; and the condition may result in the output of the high actuating signal. This occurs even if the actual amount of rain per second positioned on the detecting means is less than the large predetermined amount of drops of water.

Therefore, in the second apparatus, even when the amount of rain per second positioned on the detecting means is constant, the wiping speed of the wiper may be changed to the low or high wiping speed every time when the wiper is positioned in the initial position of the wiper.

To control the wiper in accordance with the the detecting means output signal regardless of the wiping speed of wiper, and to achieve smooth movements of the wiper at different wiping speeds in accordance with the detected amount of rain, a third apparatus has been developed.

The third apparatus includes a detecting means, a first comparator means, an actuator means, a second comparator means, a timer means, a memory means and an exchanging means.

The structure and operation of the third apparatus are disclosed in the co-pending application filed on Dec. 30, 1985 (i.e., U.S. patent application Ser. No. 814,801, now U.S. Pat. No. 4,689,536).

The third apparatus can control the wiper in accordance with the detected amount of rain positioned on the detecting means regardless of the wiping speed of the wiper and move the wiper smoothly at different wiping speeds in accordance with the detected amount of rain.

However, the third apparatus includes many components in the wiper controlling means.

To reduce the number of wiper controller means, an apparatus according to the present invention has been developed.

Figure 2:
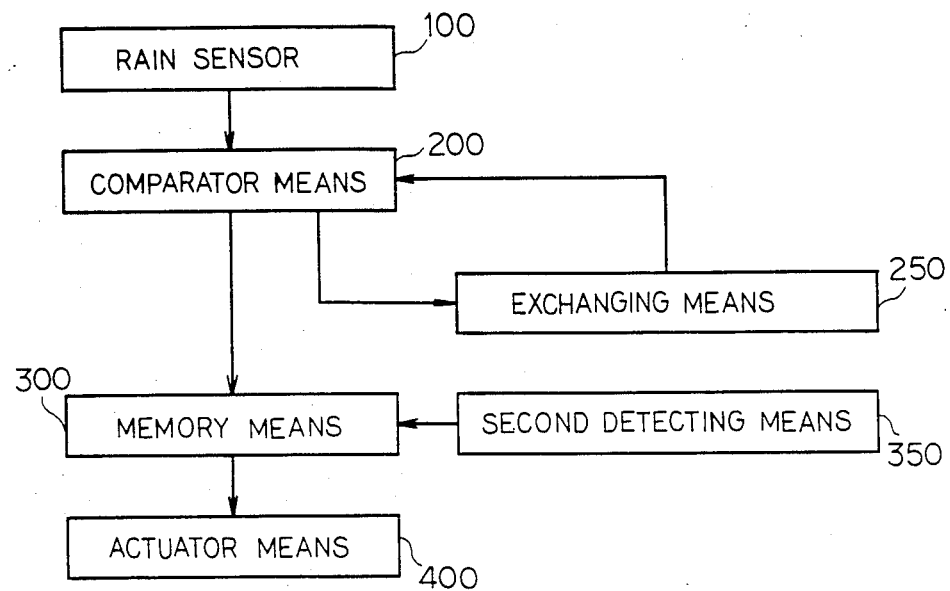
FIG. 2 is a block diagram of the present invention.
Figure 3:
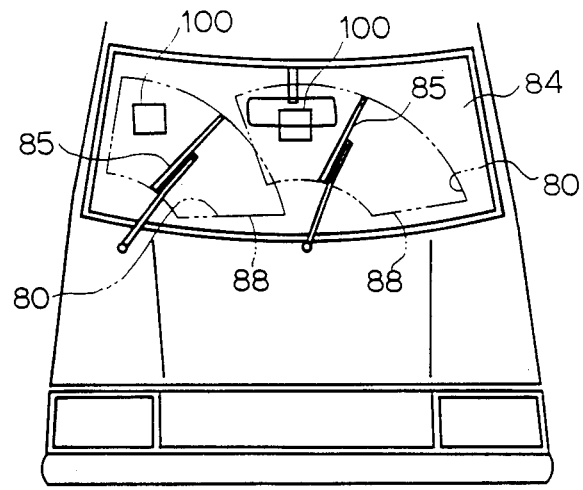
FIG. 3 is a front view of a vehicle which is equipped with an apparatus for controlling wipers according to the present invention.

Referring to FIGS. 2 and 3, an apparatus for controlling a wiper according to the present invention includes a rain sensor 100, a comparator means 200, an exchanging means 250, a memory means 300, a second detecting means 350 and an actuator means 400. The rain sensor 100 functions as a first detecting means and is located on an exterior surface of a front windshield 84 of a vehicle. The rain sensor 100 detects the amount of rain which is positioned thereon and outputs a continuous signal, as shown in FIGS. 7(A) and 7(C). The wiper 85 wipes out a wiping area 80 defined on the exterior surface of the front windshield 84 and the wiper 85 moves from and returns to an initial position 88 which is located at the lowest position of the wiping area 80.

Accordingly, when the wiper 85 stops its movement, the wiper 85 is positioned at the initial position 88 and does not present an obstacle which prevents occupants from seeing outside of the vehicle through the front windshield 84. The rain sensor 100 is located near a position at which a change in the direction of movement of the wiper 85 within the wiping area 80 occurs.

Figure 4:
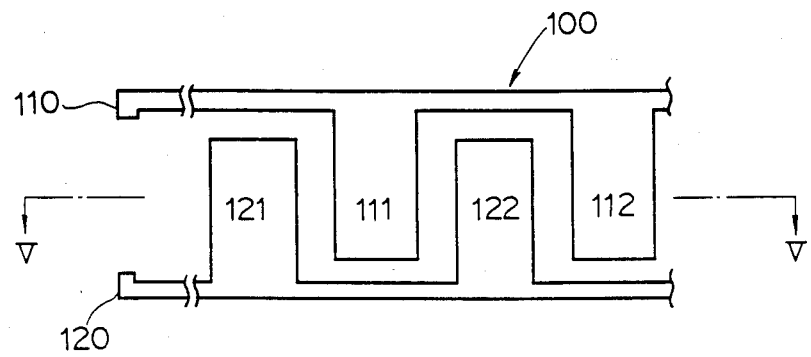
FIG. 4 is an enlarged plan view of a portion of the rain sensor.
Figure 5:
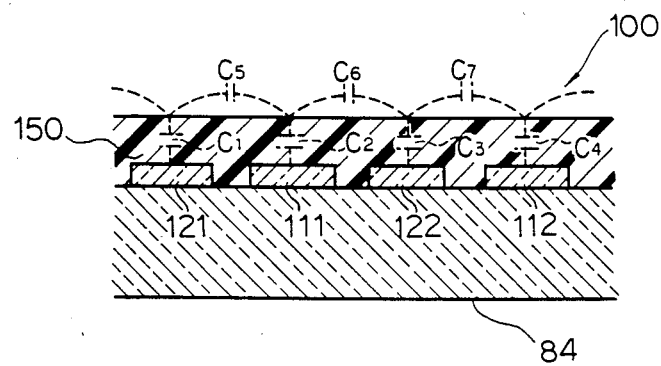
FIG. 5 is an enlarged cross-sectional view of a portion of the rain sensor taken along the line V—V in FIG. 4.

As shown in FIGS. 4 and 5, a portion of the rain sensor 100 is mounted on the exterior surface of the windshield 84. The rain sensor 100 is made of transparent material (e.g. $In_2O_3(Sn)$), so that an occupant can see outside of the vehicle through the rain sensor 100. The rain sensor 100 has a first electrode 110 and a second electrode 120. The first electrode 110 has at least first and second projections 111 and 112, and an interval defined between the first and second projections 111 and 112. The second electrode 120 has at least third and fourth projections 121 and 122, and an interval defined between the third and fourth projections 121 and 122. Further, the first projection 111 of the first electrode 110 is interleaved into the interval defined between the third and fourth projections 121 and 122 of the second electrode 120, but a clearance is defined between the first and second projections 111 and 112 of the first electrode 110 and the third and fourth projections 121 and 122 of the second electrode 120. The first and second electrodes 110 and 120 are fixed on the exterior surface of the windshield 84 by evaporation.

A protective film 150 covers the first and second electrodes 110 and 120 and the protective film 150 is fixed on the first and second electrodes 110 and 120 and the exterior surface of the windshield 84 by evaporation. The protective film 150 is made from transparent material (e.g. $Al_2O_3$) and the protective film 150 has a thickness of about one-fifth micron over the first and second electrodes 110 and 120. The rain sensor 100 has the above mentioned structure so that the rain sensor 100 forms a plurality of floating capacitors $C_1$ through $C_7$ between the first and second electrodes 100 and 120 as shown in FIG. 5.

The floating capacitors $C_1$, $C_5$ and $C_2$ are formed between the third and first projections 121 and 111 of the second and first electrodes 120 and 110, and the floating capacitors $C_2$, $C_6$ and $C_3$ are formed between the first and fourth projections 111 and 122 of the first and second electrodes 110 and 120. Further, the floating capacitors $C_3$, $C_7$ and $C_4$ are formed between the fourth and second projections 122 and 112 of the second and first electrodes 120 and 110.

The floating capacitors $C_5$, $C_6$ and $C_7$ are of variable capacitance, and when a drop of water is positioned on a portion of the protective film 150 defined between the third and first projections 121 and 111 of the second and first electrodes 120 and 110, the capacitance of the floating capacitor $C_5$ becomes more than a normal capacitance of the floating capacitor $C_5$, because the dielectric constant of the drop of water is greater than the dielectric constant of air. Accordingly, when many drops of water are positioned on the protective film 150, the total capacitance formed between the first and second electrodes 110 and 120 becomes larger. Further, the total capacitance is approximately proportional to the amount of drops of water positioned on the protective film 150.

Figure 6:
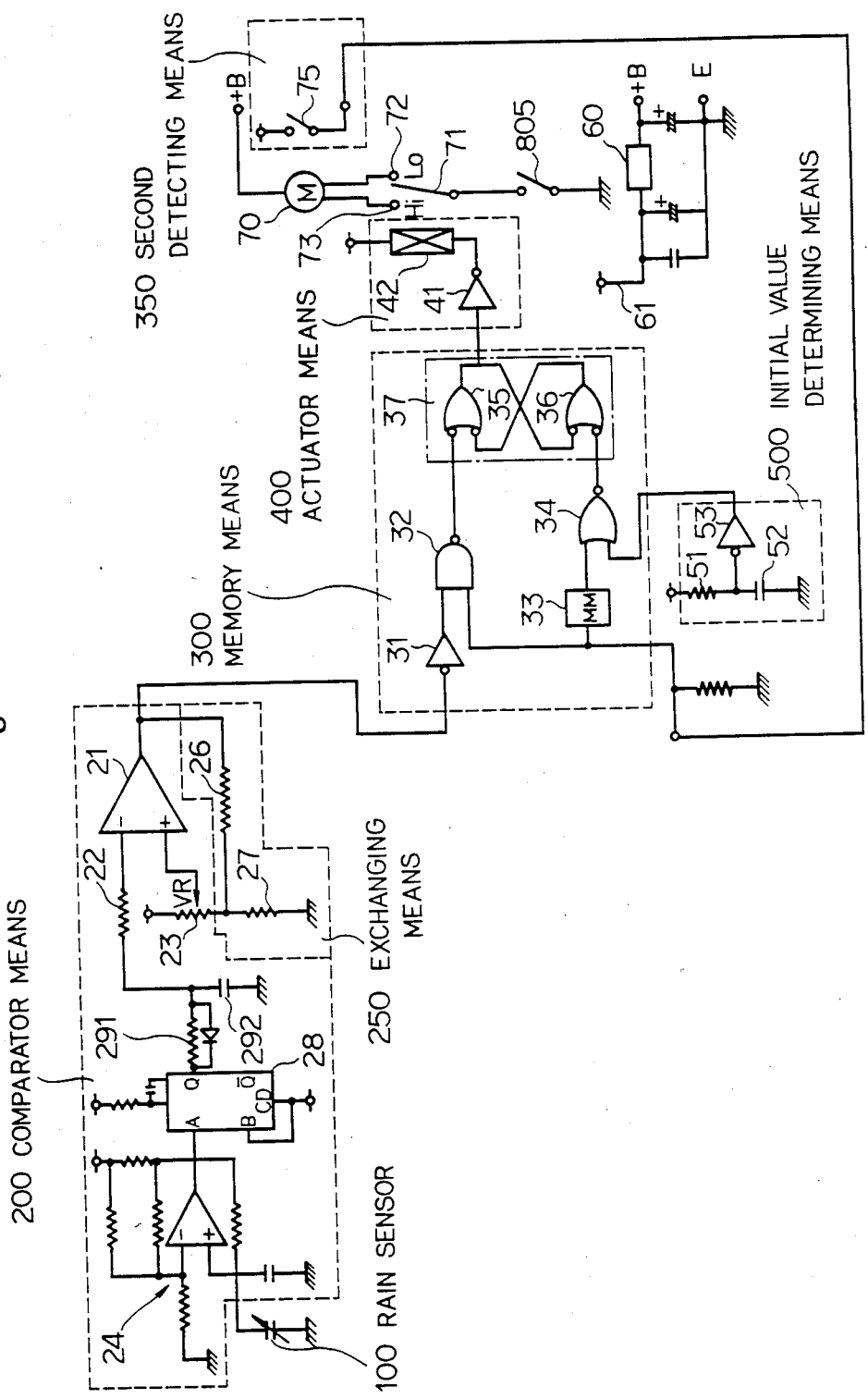
FIG. 6 is a schematic circuit illustrating a control circuit according to the present invention.

FIG. 6 shows a schematic circuit of a controlling circuit according to the present invention.

The comparator means 200 is electrically connected to the rain sensor 100 and the comparator means 200 compares the amount of rain detected by the rain sensor 100 with a first predetermined amount of drops of water.

The comparator means 200 includes an oscillator 24, a one-shot circuit 28, a first resistor 291, a condenser 292, a second resistor 22, a variable resistor 23 and a hysteresis comparator 21. The oscillator 24 is of a conventional resistor-condenser negative feedback type-oscillator which includes an operational amplifier as outputting means of the oscillator 24. The oscillator 24 is electrically connected to the rain sensor 100. When the rain sensor 100 varies its variable capacitance in proportion to the amount of rain positioned on the rain sensor 100, the oscillator 24 outputs a frequency which varies in inverse proportion to amount of rain positioned on the rain sensor 100.

The one-shot circuit 28 receives the output frequency and outputs a signal which has the same period as a period of the output frequency, and which has a constant width in spite of the magnitude of the frequency outputted from the oscillator 24. Further, the output signal from the one-shot circuit 28 has a constant off period.

An integration circuit, which consists of the first resistor 291 and the condenser 292, receives the signal outputted from the one-shot circuit 28 and the integration circuit outputs a voltage signal which has a level which is inversely proportional to the output frequency outputted from the oscillator 24.

Accordingly, the voltage signal is in proportion to the detected amount of rain, as shown in FIGS. 7(A) and 7(C). The integration circuit is electrically connected to a negative pole of the hysteresis comparator 21 through the second resistor 22, and the second resistor 22 protects the hysteresis comparator 21. The variable resistor 23 is electrically connected to a positive pole of the hysteresis comparator 21.

The comparator means 200 compares the output of the sensor 100 with one of first and second voltages "$V_1$" and "$V_2$" representing first and second predetermined amounts of drops of water and, produces an output signal according to whether the output of sensor 100 (the output of the comparator integration circuit) is equal to or greater than the compared voltage $V_1$ or $V_2$. When the output of the sensor 100 is equal to or greater than voltage $V_1$, the comparator means 200 outputs a logic level "1" output signal.

On the other hand, the comparator means 200 outputs a logic level "0" output signal when the sensor output signal is less than the voltage $V_2$.

The exchanging means 250 includes third and fourth resistors 26 and 27. The third and fourth resistors 26 and 27 are electrically connected to the variable resistor 23 respectively, and further the third resistor 26 is electrically connected to an output terminal of the hysteresis comparator 21. The exchanging means 250 exchanges one of the first and second predetermined values of the voltages $V_1$ and $V_2$ of the comparator means 200 for to other one of the first and second predetermined values of the voltages $V_1$ and $V_2$. The exchanging means 250 receives the logic level "1" output signal outputted from the comparator means 200. The exchanging means 250 exchanges the the value of the voltage $V_2$ for the value of the voltage $V_1$ when the exchanging means 250 receives the logic level "0" output signal outputted from the comparator means 200.

The memory means 300 includes an inverter 31, a NAND circuit 32, a monostable circuit 33, a NOR circuit 34 and a memory circuit 37.

The inverter 31 is electrically connected to the output terminal of the hysteresis comparator 21 and the inverter 31 inverts the output signal from the comparator means 200.

The NAND circuit 32 is electrically connected to the inverter 31, a second detecting means 350, the monostable circuit 33 and the memory circuit 37. The second detecting means 350 includes an initial position switch 75 which detects when the wiper 85 is positioned at the initial position 88. (i.e., when the wiper is positioned at the initial position 88, the initial position switch 75 of the second detecting means 350 outputs an initial position signal to the NAND circuit 32, and then an output signal from the NAND circuit 32 is inputted into the memory circuit 37.)

The monostable circuit 33 is electrically connected to the NOR circuit 34 and the monostable circuit 33 outputs an output signal during a predetermined time period after the monostable circuit 33 receives the initial position signal from the second detecting means 350. The output signal, outputted from the monostable circuit 33, has a logic level "1".

An initial value determining means 500 is electrically connected to the NOR circuit 34, and the initial value determining means 500 includes a register 51, a condenser 52 and the inverter 53. The initial value determining means 500 outputs an initial reset signal, which has a logic level "1", during a predetermined time period after the control circuit is electrically connected to an electric source (not shown in drawings), (i.e., when an ignition switch (not shown in drawings) of the vehicle is turned on). When the NOR circuit 34 receives both the logic level "1" output signal from the monostable circuit 33 and the logic level "1" initial reset signal from the initial value determining means 500, the NOR circuit 34 outputs an output signal.

The memory circuit 37 is electrically connected to the NAND circuit 32 and the NOR circuit 34, and the memory circuit 37 includes first and second NAND circuits 35 and 36. When the ignition switch is turned on, the wiper 85 is positioned at the initial position 88 and the initial value determining means 500 outputs the logic level "1" initial reset signal, so that the memory circuit 37 outputs a low output signal, which has a logic level "0".

The memory circuit 37 of the memory means 300 memorizes the logic level "1" output signal when the memory means 300 receives the logic level "1" output signal outputted from the comparator means 200.

Further, when the memory means 300 memorizes the logic level "1" output signal, the memory means 300 outputs a logic level "1" output signal. Also, when the memory means 300 memorizes the logic level "1" output signal and when the sensor output signal is equal to or greater than the voltage $V_2$, the memory means 300 outputs the logic level "1" output signal.

Furthermore, when the memory means 300 memorizes the logic level "1" output signal, the exchanging means 350 exchanges the value of voltage $V_1$ for the value of voltage $V_2$.

However, the memory means 300 does not memorize the logic level "1" output signal when the memory means 300 receives the logic level "0" output signal outputted from the comparator means 200 and the memory means 300 clears the logic level "1" output signal when the memory means 300 receives the logic level "0" output signal outputted from the comparator means 200.

The memory means 300 outputs a logic level "0" output signal when the memory means 300 does not memorize the logic level "1" output signal outputted from the comparator means 200.

Further, the comparator means 200 outputs the logic level "0" output signal when the sensor output signal is less than the voltage $V_1$ and when the memory means 300 does not memorize the logic level "1" output signal outputted from the comparator means 200.

The actuator means 400 is electrically connected to the memory circuit 37 of the memory means 300, and includes an inverter buffer 41 and a relay 42. The inverter buffer 41 inverts the output signal from the memory circuit 37 and is electrically connected to the relay 42. When the relay 42 is actuated, a moveable contact 71 is in contact with a first non-moveable terminal 73. (I.e., when the moveable contact 71 is in contact with the first non-moveable terminal 73, a motor 70 has the wiper 85 move at a high wiping speed.)

On the other hand, when the relay 42 is not actuated, the moveable contact 71 is in contact with a second non-moveable terminal 72. (I.e., when the moveable contact 71 is in contact with the second non-moveable terminal 72, the motor 70 has the wiper 85 move at a low wiping speed.)

When the ignition switch of the vehicle is turned on (i.e., in an initial reset condition), the memory circuit 37 outputs an output signal, which has a logic level "0". The inverter buffer 41 of the actuator means 400 inverts the logic level "0" output signal, as a result, the output signal has a logic level "1". When the relay 42 receives the logic level "1" output signal, the relay 42 is not actuated. When a wiper switch 805 is turned manually by the operator, the wiper 85 moves at a low wiping speed. Accordingly, in the initial reset condition, the wiper moves at a low wiping speed.

The wiper 85 has a wiper motor 70 which is a conventional wiper motor which moves at a high wiping speed or a low wiping speed. The wiper motor 70 is stopped when the initial position switch 75 is turned on, (i.e., when the initial position switch 75 determines that the wiper 85 is positioned at the initial position 88.)

Accordingly, the actuator means 400 actuates the wiper 85 at one of the high and low wiping speeds, when the actuator means 400 receives the logic level "1" output signal outputted from the memory means 300. The second detecting means 350 outputs a logic level "1" output signal to the memory means 300 when the wiper 85 is positioned at the initial position, and the memory means 300 outputs the logic level "1" output signal when the memory means 300 receives the logic level "1" output signal and when the memory means 300 memorizes the logic level "1" output signal.

A voltage regulator 60 generates a constant voltage (i.e., 5 V), when the ignition switch is turned on and when the electric source is connected between a terminal "+B" and an earth terminal. Further, the voltage regulator 60 supplies the constant voltage from an output terminal 61 to all elements of the control circuit. The initial value determining means 500 outputs a logic level "1" output signal, until the condenser 52 is charged.

When the NAND circuit 34 receives the logic level "1" output signal from the initial value determining means 500, the NAND circuit 34 outputs a logic level "0" output signal. As a result, the memory circuit 37 is in the initial reset condition.

When an operator turns on the wiper switch 805, the wiper 85 moves at a low wiping speed, because the moveable contact 71 is in contact with the second terminal 72 in the initial reset condition.

When the rain sensor 100 does not detect any rain thereon, the rain sensor 100 outputs a logic level "0" output signal. As a result, the hysteresis comparator 21 outputs an output signal which has a logic level "1". Further, in this condition, the hysteresis comparator 21 has a first predetermined voltage "$V_1$" which is set by the third and fourth resistors 26 and 27.

As shown by broken line "Sa" in FIG. 7(A), when the amount of rain detected by the rain sensor 100 is smaller than a large predetermined amount of drops of water, the integration circuit outputs a smaller voltage signal "Sa" than the first predetermined voltage "$V_1$". Accordingly, when the hysteresis comparator 21 receives the smaller voltage signal "Sa", the hysteresis comparator 21 outputs an output signal, which has a logic level "1".

The logic level "1" output signal is inputted to the inverter 31 and the inverter 31 inverts the logic level "1" output signal to the logic level "0" signal which is inputted to one of terminals of the NAND circuit 32.

As shown in FIGS. 8(A) and 8(B), in this condition, when the logic level "1" initial position signal is inputted to another terminal of the NAND circuit 32 (i.e., when the wiper 85 is positioned at the initial position 88), the NAND circuit 32 outputs a logic level "1" signal to the memory circuit 37. As a result, the memory circuit 37 maintains the initial reset condition.

Accordingly, the memory circuit 37 outputs a logic level "0" signal and then, the inverter buffer 41 outputs a logic level "1" signal. As a result, the relay 42 is not actuated, and the wiper 85 moves at a low wiping speed, because the moveable contact 71 of the wiper motor 70 is in contact with the second terminal 72.

On the other hand, as shown by a solid line "$S_b$" in FIG. 7(A), when the rain sensor 100 detects an amount of rain which is greater than the large predetermined amount of drops of water, the integration circuit outputs a larger voltage signal "$S_b$" than the first predetermined voltage "$V_1$".

Accordingly, when the hysteresis comparator 21 receives the larger voltage signal "$S_b$", the hysteresis comparator 21 outputs an output signal, which has a logic level "0".

The logic level "0" output signal is inputted to the inverter 31, and the inverter 31 inverts the logic level "0" output signal to the logic level "1" signal which is inputted to one of terminals of the NAND circuit 32.

As shown in FIG. 7(B), in this condition, when the logic level "1" initial position signal is inputted to another terminal of the NAND circuit 32, the NAND circuit 32 outputs a logic level "0" signal to the memory circuit 37. Accordingly, the memory circuit 37 memorizes the logic level "1" signal and the memory circuit 37 outputs a logic level "1" signal. Then the inverter buffer 41 outputs a logic level "0" signal. As a result, when the wiper 85 is positioned at the initial position 88, the relay 42 is actuated, and the wiper 85 starts to move at a high wiping speed.

Therefore, the actuator means 400 of the control circuit changes the low wiping speed to the high wiping speed only when the memory means 300 receives the initial position signal from the second detecting means 350, (i.e., only when the wiper 85 is positioned at the initial position 88).

Thus, the apparatus accordingly to the present invention achieves a smooth change of the wiping speed.

Simultaneously, when the actuator means 400 changes the low wiping speed to the high wiping speed, the exchanging means 250 exchanges the first predetermined voltage "$V_1$" of the hysteresis comparator 21 for the second predetermined voltage "$V_2$" (i.e., when the hysteresis comparator 21 outputs the logic level "0" signal, a voltage of the positive terminal of the hysteresis comparator 21 is lowered by the third and fourth resistors 26 and 27 of the exchanging means 250.)

Accordingly, as shown in FIGS. 7(C) and 7(D), when the amount of rain per second is constant and the wiper 85 moves at a high wiping speed, the voltage signal "$S_c$", outputted from the integration circuit, becomes smaller than the voltage signal "$S_b$", shown in FIG. 7(A) since the amount of rain detected in a high wiping condition is less than the amount of rain detected in a low wiping condition.

However, the exchanging means 250 exchanges the first predetermined voltage "$V_1$" for the second predetermined voltage "$V_2$". Thus, even if the voltage signal "$S_c$", outputted from the integration circuit, is less than the first predetermined voltage "$V_1$", the voltage signal "$S_c$" is greater than the second predetermined voltage "$V_2$".

Accordingly, the wiper 85 is kept moving at the high wiping speed, even if the amount of rain detected becomes small.

Therefore, when the rain sensor 100 detects an amount of rain which is greater than the first predetermined amount of drops, the actuator means 400 actuates the wiper 85 at a high wiping speed, and also when the rain sensor 100 detects an amount of rain which is greater than the second predetermined amount of drops and when the memory means 300 memorizes the second output signal outputted from the comparator means 200, the actuator means 400 actuates the wiper 85 at a high wiping speed.

Further, FIG. 7(D) shows the initial position signal when the wiper 85 moves at a high wiping speed. The second predetermined voltage "$V_2$" corresponds to a small predetermined amount of drops of water.

A voltage difference between the first and second predetermined voltages "$V_1$" and "$V_2$" is greater than a voltage difference between the voltage signals "$S_b$" and "$S_c$", when the amount of rain per second is constant.

Therefore, when the amount of rain detected by the rain sensor 100 is greater than the small predetermined amount of drops of water, the high wiping speed is maintained, even when the voltage signal "$S_c$" outputted from the integration circuit becomes small in the high wiping speed condition.

As described herein, the present invention overcomes the shortcomings of the known art by providing an apparatus for controlling a wiper, which exchanges one signal representing one of a plurality of predetermined amounts of drops of water for another signal representing another one of the predetermined amounts of drops of water, and which moves the wiper smoothly at different wiping speeds in accordance with the detected amount of rain.

While the present invention has been described in its preferred embodiments, it is to be understood that the invention is not limited thereto, and may be otherwise embodied within the scope of the following claims.

What is claimed is:

1. An apparatus for controlling a wiper comprising:
   first detecting means for detecting an amount of rain positioned thereon and outputting a first output signal corresponding to the detected amount of rain;
   comparator means for comparing the first output signal with a first preset signal representing one of a first and a second predetermined amount of drops of water, and for outputting a second output signal if the first output signal is equal to or greater than said first preset signal;
   memory means for memorizing the second output signal and outputting a fourth output signal;
   exchanging means responsive to the second output signal for exchanging said first preset signal with a second preset signal representing the other one of the first and the second predetermined amount of drops of water;
   actuator means for actuating the wiper at one of a high and a low wiping speed, wherein said actuator means actuates the wiper at the high wiping speed in response to the fourth output signal
   when said first output signal is greater than one of said first and second preset signals.

2. The apparatus of claim 1, wherein said comparator means outputs a third output signal when said first output signal is less than a third preset signal representing the first predetermined amount of drops of water and when said memory means does not memorize the second output signal outputted from said comparator means.

3. The apparatus of claim 1, wherein said comparator means outputs a third output signal when said first output signal is less than a fourth preset signal representing the second predetermined amount of drops of water.

4. The apparatus of claim 1, wherein said memory means outputs a fifth output signal when said memory means does not memorize the second output signal outputted from said comparator means.

5. The apparatus of claim 2, wherein said memory means does not memorize the second output signal when said memory means receives the third output signal outputted from said comparator means.

6. The apparatus of claim 3, wherein said memory means clears off the second output signal when said memory means receives the third output signal outputted from said comparator means.

7. The apparatus of claim 2, wherein said exchanging means exchanges a fourth preset signal representing the second predetermined amount of drops of water for the third preset signal when said exchanging means receives the third output signal outputted from said comparator means.

8. The apparatus of claim 3, wherein said exchanging means exchanges the fourth preset signal for a third preset signal representing the first predetermined amount of drops of water when said exchanging means receives the third output signal outputted from said comparator means.

9. The apparatus of claim 1, further comprising second detecting means, said second detecting means detects if the wiper is positioned at an initial position, wherein said second detecting means outputs a sixth output signal to said memory means when the wiper is positioned at the initial position.

10. The apparatus of claim 9, wherein said memory means outputs said fourth output signal when said memory means receives the sixth output signal and when said memory means memorizes the second output signal.

11. An apparatus for controlling a wiper comprising:
    first detecting means for detecting an amount of rain positioned thereon and outputting a first output signal corresponding to the detected amount of rain;
    comparator means for comparing the first output signal with a first preset signal representing one of a first and a second predetermined amount of drops of water, and for outputting a second output signal if the first output signal is equal to or greater than first preset signal;
    memory means for memorizing the second output signal and for outputting a fourth output signal when said first output signal is equal to or greater than a third preset signal representing the second predetermined amount of drops of water;
    exchanging means responsive to the second and fourth output signals for exchanging said first preset signal with a second preset signal representing the other one of the first and the second predetermined amount of drops of water;
    actuator means for actuating the wiper at one of a high and a low wiping speed, wherein said actuator means actuates the wiper at the high wiping speed in response to the fourth output signal
    when said first output signal is greater than one of said first and second preset signals.

12. The apparatus of claim 11, further comprising second detecting means for detecting if the wiper is positioned at an initial position and outputting a sixth output signal to said memory means when the wiper is positioned at the initial position.

13. The apparatus of claim 12, wherein said memory means outputs the fourth output signal when said memory means receives the sixth output signal and memorizes the second output signal.

14. An apparatus for controlling a wiper comprising:
first detecting means for detecting an amount of rain positioned thereon and outputting a first output signal corresponding to the detected amount of rain;
comparator means for comparing the first output signal with a first preset signal representing one of a first and a second predetermined amount of drops of water, and for outputting a second output signal if the first output signal is equal to or greater than said first preset signal;
memory means for memorizing the second output signal and outputting a fourth output signal;
exchanging means responsive to the second output signal for exchanging said first preset signal with a second preset signal representing the other one of the first and the second predetermined amount of drops of water;
second detecting means detecting if the wiper is positioned at an initial position and outputting a sixth output signal to said memory means when the wiper is positioned at the initial position; said memory means outputting the fourth output signal in response to the sixth output signal;
actuator means for actuating the wiper at one of a high and a low wiping speed, wherein said actuator means actuates the wiper at the high wiping speed in response to the fourth output signal when said first output signal is greater than one of said first and second preset signals.

15. The apparatus of claim 14, wherein said memory means outputs a fifth output signal when said memory means does not memorize the second output signal from said comparator means.

16. The apparatus of claim 15, wherein the comparator means outputs a third output signal when said first output signal is less than a third preset signal representing the first predetermined amount of drops of water and when said memory means does not memorize the second output signal from the comparator means.

17. The apparatus of claim 15, wherein the comparator means outputs a third output signal when said first output signal is less than a fourth preset signal representing the second predetermined amount of drops of water and when said memory means does not memorize the second output signal from the comparator means.

18. The apparatus of claim 16, wherein said memory means does not memorize the second output signal when said memory means receives the third output signal from said comparator means.

19. The apparatus of claim 17, wherein said memory means eraser the second output signal when said memory means receives the third output signal from said comparator means.

20. The apparatus of claim 19, wherein said exchanging means exchanges the fourth preset signal for a third preset signal when said exchanging means receives the third output signal from said comparator means.

* * * * *